(12) United States Patent
Ota

(10) Patent No.: US 12,513,416 B2
(45) Date of Patent: Dec. 30, 2025

(54) IMAGE SIGNAL PROCESSING DEVICE, ENDOSCOPE SYSTEM, IMAGE SIGNAL PROCESSING METHOD, AND COMPUTER-READABLE RECORDING MEDIUM

(71) Applicant: OLYMPUS CORPORATION, Tokyo (JP)

(72) Inventor: Chikashi Ota, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 21 days.

(21) Appl. No.: 18/819,069

(22) Filed: Aug. 29, 2024

(65) Prior Publication Data
US 2024/0422442 A1 Dec. 19, 2024

Related U.S. Application Data

(63) Continuation of application No. PCT/JP2022/010706, filed on Mar. 10, 2022.

(51) Int. Cl.
*H04N 23/84* (2023.01)
*H04N 23/12* (2023.01)
(Continued)

(52) U.S. Cl.
CPC ............. *H04N 23/84* (2023.01); *H04N 23/12* (2023.01); *H04N 23/555* (2023.01);
(Continued)

(58) Field of Classification Search
CPC ...... H04N 23/84; H04N 23/12; H04N 23/555; H04N 23/56; H04N 25/134; H04N 25/47; A61B 1/00; A61B 1/04; A61B 1/045
See application file for complete search history.

(56) References Cited

U.S. PATENT DOCUMENTS

| 5,092,331 A * | 3/1992 | Nakamura ............. H04N 23/63 |
| | | 348/E5.029 |
| 6,563,105 B2 * | 5/2003 | Seibel .................... H04N 23/55 |
| | | 250/234 |

(Continued)

FOREIGN PATENT DOCUMENTS

| JP | 2003036436 A | 2/2003 |
| JP | 2010022700 A | 2/2010 |

(Continued)

OTHER PUBLICATIONS

International Search Report dated May 24, 2022 received in PCT/JP2022/010706.

*Primary Examiner* — Chiawei Chen
(74) *Attorney, Agent, or Firm* — Scully, Scott, Murphy & Presser, P.C.

(57) ABSTRACT

An image signal processing device includes: a processor configured to process a first image signal and a second image signal, the first image signal being obtained by a first imaging portion capturing excitation light that is reflected from an observation target by irradiating the observation target with the excitation light, the second image signal being obtained by a second imaging portion capturing fluorescence from the observation target when excited by irradiating the observation target with the excitation light.

11 Claims, 7 Drawing Sheets

(51) Int. Cl.
*H04N 23/50* (2023.01)
*H04N 23/56* (2023.01)
*H04N 25/13* (2023.01)
*H04N 25/47* (2023.01)

(52) U.S. Cl.
CPC ........... *H04N 23/56* (2023.01); *H04N 25/134* (2023.01); *H04N 25/47* (2023.01)

(56) References Cited

U.S. PATENT DOCUMENTS

| | | | | |
|---|---|---|---|---|
| 9,460,496 | B2* | 10/2016 | Ishihara | A61B 1/0669 |
| 2003/0216626 | A1* | 11/2003 | Tsujita | A61B 5/0084 |
| | | | | 600/321 |
| 2004/0064016 | A1* | 4/2004 | Kobayashi | A61B 5/0071 |
| | | | | 600/109 |
| 2007/0015963 | A1* | 1/2007 | Fengler | A61B 1/043 |
| | | | | 348/E5.029 |
| 2009/0290017 | A1* | 11/2009 | Shibasaki | H04N 23/56 |
| | | | | 348/71 |
| 2010/0245551 | A1 | 9/2010 | Morita | |
| 2010/0245616 | A1 | 9/2010 | Yoshino et al. | |
| 2012/0076434 | A1* | 3/2012 | Watanabe | A61B 1/0655 |
| | | | | 382/274 |
| 2013/0003922 | A1* | 1/2013 | Watanabe | G06T 5/50 |
| | | | | 378/42 |
| 2017/0319052 | A1* | 11/2017 | Yasugi | A61B 1/00009 |
| 2020/0281472 | A1 | 9/2020 | Deguchi | |

FOREIGN PATENT DOCUMENTS

| | | |
|---|---|---|
| JP | 2010227254 A | 10/2010 |
| JP | 2010227256 A | 10/2010 |
| JP | 2020141917 A | 9/2020 |
| WO | 2006004038 A1 | 1/2006 |

* cited by examiner

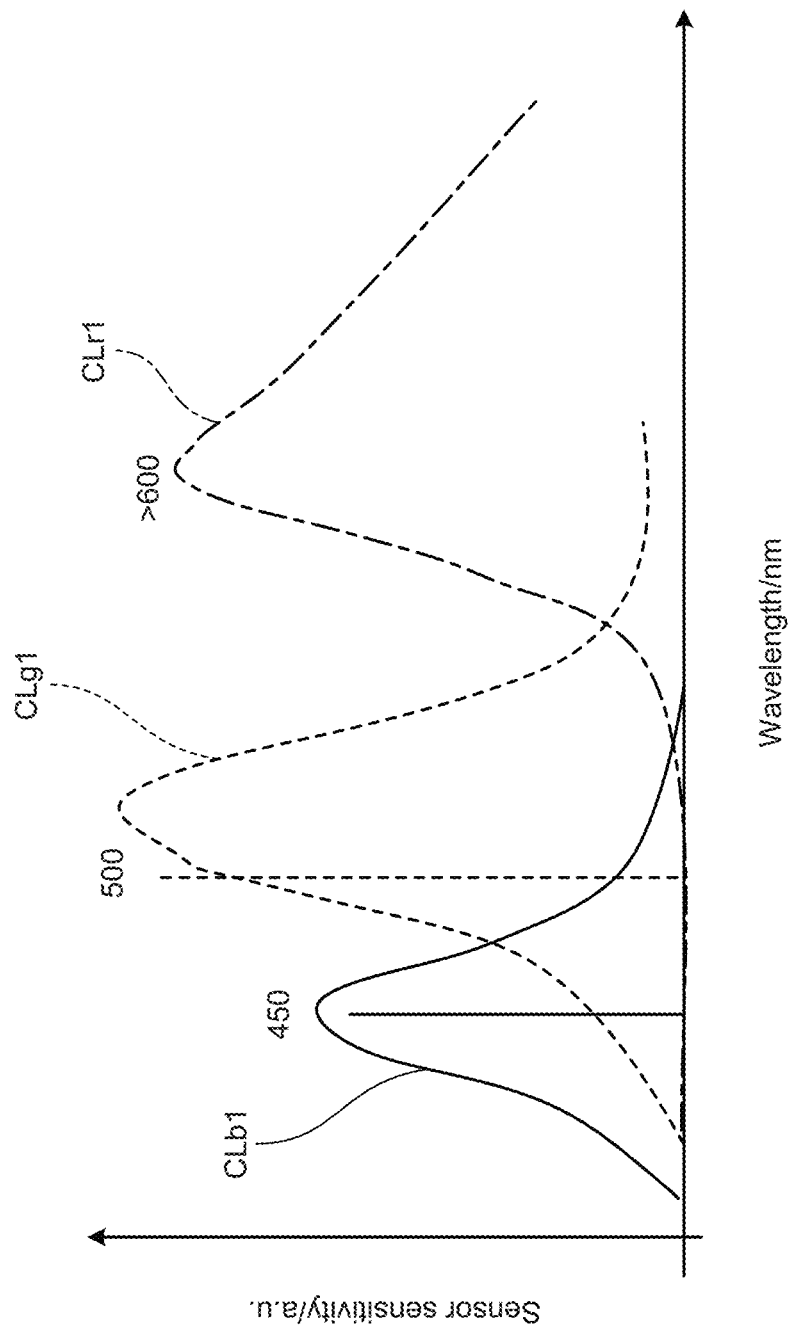

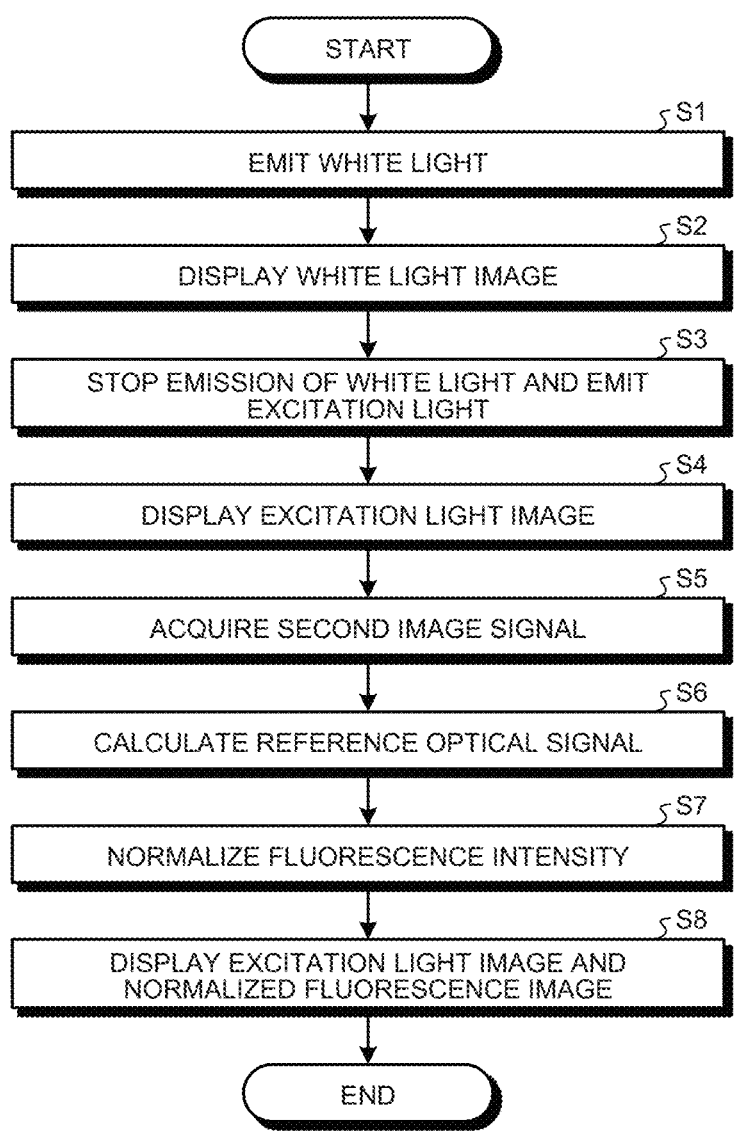

IMAGE SIGNAL PROCESSING DEVICE, ENDOSCOPE SYSTEM, IMAGE SIGNAL PROCESSING METHOD, AND COMPUTER-READABLE RECORDING MEDIUM

CROSS-REFERENCE TO RELATED APPLICATION

This application is a continuation of International Application No. PCT/JP2022/010706, filed on Mar. 10, 2022, the entire contents of which are incorporated herein by reference.

BACKGROUND

1. Technical Field

The present disclosure relates to an image signal processing device, an endoscope system, an image signal processing method, and a computer-readable recording medium.

2. Related Art

In the related art, studies on a photo-immuno therapy (PIT) for specifically killing only cancer cells by administering an antibody drug including an antibody that binds to the surface of cancer cells and a phthalocyanine derivative IR 700 to a subject and then irradiating the subject with near infrared light have been conducted. At this time, the antibody drug emits fluorescence by being excited by irradiation with near-infrared light. The fluorescence intensity is used as an index of a therapeutic effect. Therefore, by capturing the fluorescence by the imaging device, it is possible to grasp the therapeutic effect from the intensity of fluorescence captured by the imaging device.

Here, the intensity of fluorescence captured by the imaging device varies depending on the distance between the subject and the imaging device even in a case where the subject (here, the cancer cell containing the antibody drug) emits the same fluorescence intensity.

Therefore, in the related art, in order to obtain a constant fluorescence intensity even in a case where the distance changes without depending on the distance between the subject and the imaging device, a technique has been proposed in which fluorescence and reference light are captured by the imaging device, and the fluorescence intensity is normalized by the reference light intensity (see, for example, JP 2003-036436 A).

SUMMARY

In some embodiments, an image signal processing device includes: a processor configured to process a first image signal and a second image signal, the first image signal being obtained by a first imaging portion capturing excitation light that is reflected from an observation target by irradiating the observation target with the excitation light, the second image signal being obtained by a second imaging portion capturing fluorescence from the observation target when excited by irradiating the observation target with the excitation light, a color filter in which a plurality of filter groups having spectral characteristics different from each other is disposed in a specific format being provided on a light receiving face of the first imaging portion, the processor being configured to process the first image signal, calculate a reference optical signal based on a signal from a pixel of the first imaging portion provided with a filter group other than a filter group corresponding to a wavelength band of a color closest to a wavelength of the excitation light among the plurality of filter groups, and normalize the second image signal based on the reference optical signal.

In some embodiments, an endoscope system includes: a light source configured to irradiate excitation light; a first imaging portion configured to output a first image signal by capturing the excitation light that is reflected from an observation target by irradiating the observation target with the excitation light; and a second imaging portion configured to output a second image signal by capturing fluorescence from the observation target when excited by irradiating the observation target with the excitation light; and an image signal processing device, wherein the image signal processing device includes a processor configured to process the first image signal and the second image signal, wherein a color filter in which a plurality of filter groups having spectral characteristics different from each other is disposed in a specific format is provided on a light receiving face of the first imaging portion, and wherein the processor is configured to process the first image signal, calculate a reference optical signal based on a signal from a pixel of the first imaging portion provided with a filter group other than a filter group corresponding to a wavelength band of a color closest to a color of a wavelength of the excitation light among the plurality of filter groups, and normalize the second image signal based on the reference optical signal.

In some embodiments, provided is an image signal processing method executed by a processor of an image signal processing device. The method includes: processing a first image signal obtained by a first imaging portion capturing excitation light that is reflected from an observation target by irradiating the observation target with the excitation light, calculating a reference optical signal based on a signal from a pixel of the first imaging portion provided with a filter group other than a filter group corresponding to a wavelength band of a color closest to a color of a wavelength of the excitation light; and normalizing, based on the reference optical signal, a second image signal obtained by a second imaging portion capturing fluorescence from the observation target when excited by irradiating the observation target with the excitation light.

In some embodiments, provided is a non-transitory computer-readable recording medium with an executable program stored thereon. The program causes a processor of an image signal processing device to execute: processing a first image signal obtained by a first imaging portion capturing excitation light that is reflected from an observation target by irradiating the observation target with the excitation light, calculating a reference optical signal based on a signal from a pixel of the first imaging portion provided with a filter group other than a filter group corresponding to a wavelength band of a color closest to a color of a wavelength of the excitation light; and normalizing, based on the reference optical signal, a second image signal obtained by a second imaging portion capturing fluorescence from the observation target when excited by irradiating the observation target with the excitation light.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 4 is a diagram illustrating sensitivity of each pixel in an imaging element;

FIG. 5 is a flowchart illustrating an image signal processing method;

DETAILED DESCRIPTION

Figure 1:
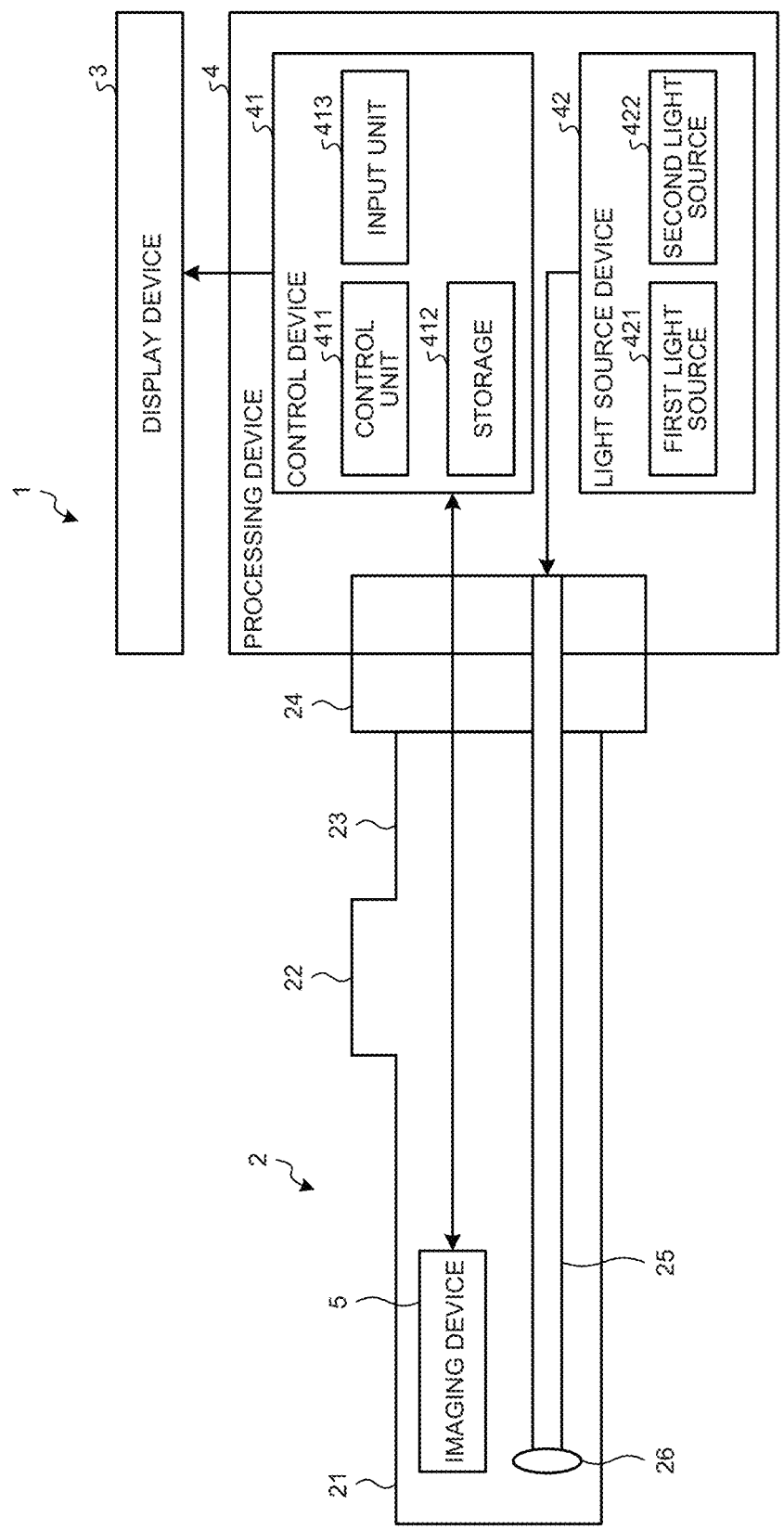
FIG. 1 is a diagram illustrating a configuration of an endoscope system according to the embodiment.

Hereinafter, modes for carrying out the disclosure (embodiments) will be described with reference to the drawings. Note that the disclosure is not limited by the embodiments described below. Further, in the description of the drawings, the same parts will be described with the same reference numerals.

Configuration of Endoscope System

An endoscope system 1 is a system that is used, for example, in a medical field and performs treatment while observing the inside of the subject (the inside of the living body). As illustrated in FIG. 1, the endoscope system 1 includes an endoscope 2, a display device 3, and a processing device 4.

In the present embodiment, the endoscope 2 is a so-called flexible endoscope. The endoscope 2 is partially inserted into the living body and capturing the inside of the living body to output an image signal generated by the capturing. As illustrated in FIG. 1, the endoscope 2 includes an insertion unit 21, an operating unit 22, a universal cord 23, and a connector unit 24.

The insertion unit 21 is a portion at least part of which has flexibility and that is inserted into a living body. In the insertion unit 21, a light guide 25, an illumination lens 26, and an imaging device 5 are provided.

The light guide 25 is routed from the insertion unit 21 to the connector unit 24 through the operating unit 22 and the universal cord 23. One end of the light guide 25 is located at a distal end portion in the insertion unit 21. In addition, in a state where the endoscope 2 is connected to the processing device 4, the other end of the light guide 25 is located in the processing device 4. Then, the light guide 25 transmits the light supplied from a light source device 42 in the processing device 4 from the other end to one end.

The illumination lens 26 faces one end of the light guide 25 in the insertion unit 21. Then, the illumination lens 26 irradiates the inside of the living body with the light transmitted by the light guide 25.

The imaging device 5 is provided at a distal end portion in the insertion unit 21. Then, the imaging device 5 captures the inside of the living body to output an image signal generated by the capturing.

Note that a detailed configuration of the imaging device 5 will be described in "Configuration of imaging device" described later.

The operating unit 22 is connected to a proximal end portion of the insertion unit 21. Then, the operating unit 22 receives various operations of the endoscope 2.

The universal cord 23 is a cord that extends from the operating unit 22 in a direction different from the extending direction of the insertion unit 21, and in which a signal line, a light guide 25, and the like that electrically connect the imaging device 5 and a control device 41 in the processing device 4 are disposed.

The connector unit 24 is provided at an end portion of the universal cord 23 and is detachably connected to the processing device 4.

The display device 3 is a liquid crystal display (LCD), an electro luminescence (EL) display, or the like, and displays an image or the like the image process is executed by the processing device 4.

As illustrated in FIG. 1, the processing device 4 includes the control device 41 and the light source device 42. In the present embodiment, the light source device 42 and the control device 41 are provided in one casing as the processing device 4, but the disclosure is not limited thereto, and the light source device 42 and the control device 41 may be provided in separate casings.

The light source device 42 supplies specific light to the other end of the light guide 25 under the control of the control device 41. As illustrated in FIG. 1, the light source device 42 includes a first light source 421 and a second light source 422.

The first light source 421 emits light in a first wavelength band. In the present exemplary embodiment, first light source 421 emits white light as light in the first wavelength band. Examples of the first light source 421 include a light emitting diode (LED) and the like.

The second light source 422 emits excitation light in a second wavelength band different from the first wavelength band. In the present embodiment, the second light source 422 emits excitation light (wavelength longer than 680 nm (about 690 nm)) for exciting the antibody drug used in the PIT as excitation light in the second wavelength band. In addition, when excited by the excitation light, the antibody drug emits fluorescence having a central wavelength on a longer wavelength side than a central wavelength of a wavelength band of the excitation light. As the second light source 422, a semiconductor laser or the like can be exemplified.

The control device 41 corresponds to an image signal processing device. The control device 41 integrally controls the operation of the entire endoscope system 1. Then, as illustrated in FIG. 1, the control device 41 includes a control unit 411, a storage 412, and an input unit 413.

The control unit 411 corresponds to a processor. The control unit 411 includes a controller such as a central processing unit (CPU) or a micro processing unit (MPU), or an integrated circuit such as an application specific integrated circuit (ASIC) or a field programmable gate array (FPGA), and controls the entire operation of the endoscope system 1. Note that the function of the control unit 411 will be described in "Image signal processing method" described later.

The storage 412 stores various programs executed by the control unit 411 (including the image signal processing program), information necessary for processing of the control unit 411, and the like.

The input unit 413 includes a keyboard, a mouse, a switch, a touch panel, and the like, and receives a user operation by a user such as an operator. Then, the input unit 413 outputs an operation signal corresponding to the user operation to the control unit 411.

Configuration of Imaging Device

Next, a configuration of the imaging device 5 will be described.

Figure 2:
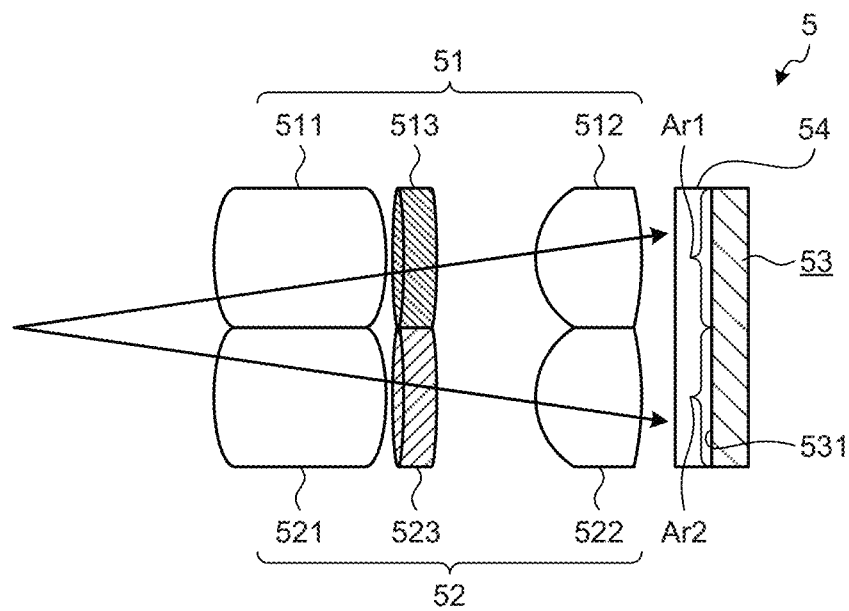
FIG. 2 is a diagram illustrating a configuration of an imaging device.

FIG. 2 is a diagram illustrating a configuration of the imaging device 5.

As illustrated in FIG. 2, the imaging device 5 includes a so-called two-eyes single-plate including two optical systems of the first and second optical systems 51 and 52 and one imaging element 53.

As illustrated in FIG. 2, the first optical system 51 captures a subject image and forms the subject image in a first area Ar1 of a light receiving face 531 of the imaging element 53. The first area Ar1 corresponds to a first imaging portion. Hereinafter, for convenience of description, the subject image formed in the first area Ar1 by the first optical system 51 is referred to as a first subject image.

The first optical system 51 includes first and second lenses 511, 512 and a first cut filter 513.

Each of the first and second lenses 511, 512 includes one or a plurality of lenses, captures a first subject image, and forms the first subject image in the first area Ar1.

The first cut filter 513 is disposed between the first and second lenses 511, 512, and cuts only the light in the second wavelength band out of the light passing through the first lens 511. In the present embodiment, as described above, excitation light (wavelength longer than 680 nm (about 690 nm)) that excites the antibody drug used in the PIT is used as light in the second wavelength band. Therefore, the first cut filter 513 cuts only light having a central wavelength of 690 nm. The OD value of the first cut filter 513 is a relatively low value. That is, the first cut filter 513 transmits part of the excitation light.

Therefore, in a case where the inside of the living body is irradiated with only white light, the first subject image consists of the white light reflected inside the living body. Furthermore, in a case where the inside of the living body is irradiated with only the excitation light, the first subject image consists of the excitation light reflected inside the living body and the fluorescence emitted from the antibody drug by the excitation light. Furthermore, in a case where the inside of the living body is simultaneously irradiated with white light and excitation light, the first subject image consists of white light and excitation light reflected inside the living body, and fluorescence emitted from the antibody drug by the excitation light.

As illustrated in FIG. 2, the second optical system 52 captures a subject image and forms the subject image in a second area Ar2 of the light receiving face 531 of the imaging element 53. The second area Ar2 corresponds to a second imaging portion. Hereinafter, for convenience of description, the subject image formed in the second area Ar2 by the second optical system 52 is referred to as a second subject image.

The second optical system 52 includes third and fourth lenses 521, 522 and a second cut filter 523.

Each of the third and fourth lenses 521, 522 includes one or a plurality of lenses, captures a second subject image, and forms the second subject image in the second area Ar2.

The second cut filter 523 is disposed between the third and fourth lenses 521, 522, and cuts only the light in the second wavelength band out of the light passing through the third lens 521. In the present embodiment, as described above, excitation light (wavelength longer than 680 nm (about 690 nm)) that excites the antibody drug used in the PIT is used as light in the second wavelength band. Therefore, the second cut filter 523 cuts only light having a central wavelength of 690 nm. The OD value of the second cut filter 523 is higher than the OD value of the first cut filter 513, and is, for example, "4" or more. That is, the second cut filter 523 cuts substantially all of the excitation light.

Therefore, in a case where the inside of the living body is irradiated with only white light, the second subject image consists of white light reflected inside the living body, as in the first subject image. In addition, in a case where the inside of the living body is irradiated with only the excitation light, the second subject image does not include the excitation light reflected inside the living body, and consists of only the fluorescence emitted from the antibody drug by the excitation light. Furthermore, in a case where the inside of the living body is simultaneously irradiated with white light and excitation light, the second subject image does not include the excitation light reflected inside the living body, and consists of the white light reflected inside the living body and fluorescence emitted from the antibody drug by the excitation light.

The imaging element 53 includes a charge coupled device (CCD), a complementary metal oxide semiconductor (CMOS), or the like that receives the first and second subject images and converts the images into an electric signal. Hereinafter, for convenience of description, an image signal generated by capturing a first subject image is referred to as a first image signal, and an image signal generated by capturing a second subject image is referred to as a second image signal.

Here, a color filter 54 (FIG. 2) in which three filter groups grouped according to wavelength bands of light (R (red), G (green), B (blue)) to be transmitted are disposed in a predetermined format (for example, the Bayer array) is arranged on the light receiving face 531 of the imaging element 53.

Figure 3:
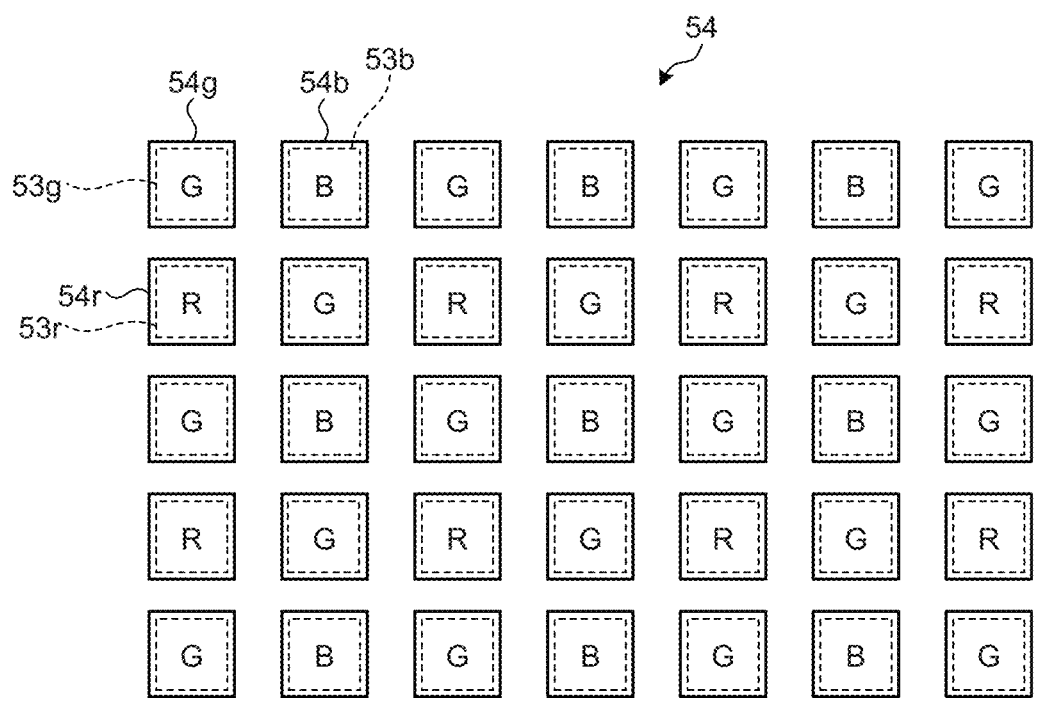
FIG. 3 is a diagram illustrating a color filter.

FIG. 3 is a diagram illustrating the color filter 54.

Specifically, as illustrated in FIG. 3, the color filter 54 includes an R filter group 54r that mainly transmits light in an R wavelength band, a B filter group 54b that mainly transmits light in a B wavelength band, a first G filter group (disposed in the same column as the R filter group 54r) that mainly transmits light in a G wavelength band, and a second G filter group (disposed in the same column as the B filter group 54b) that mainly transmits light in a G wavelength band. In FIG. 3, the first and second G filter groups are collectively referred to as a G filter group 54g. In FIG. 3, the letter "R" is attached to the R filter group 54r, the letter "G" is attached to the G filter group 54g, and the letter "B" is attached to the B filter group 54b. Furthermore, in FIG. 3, as each pixel on the light receiving face 531 of the imaging element 53, a pixel provided with the R filter group 54r is an R pixel 53r, a pixel provided with the G filter group 54g is a G pixel 53g, and a pixel provided with the B filter group 54b is a B pixel 53b.

FIG. 4 is a diagram illustrating the sensitivity of each of the pixels 53r, 53g, 53b in the imaging element 53. Note that, in FIG. 4, the sensitivity of the R pixel 53r is indicated by a curve CLr1, the sensitivity of the G pixel 53g is indicated by a curve CLg1, and the sensitivity of the B pixel 53b is indicated by a curve CLb1.

When compared with the second wavelength band (central wavelength: 690 nm) of the excitation light, the sensitivity of each of the pixels 53r, 53g, and 53b to the excitation light is, as can be seen from FIG. 4, the sensitivity of the R pixel 53r is the highest and the sensitivity of the B pixel 53b is the lowest.

Image Signal Processing Method

Next, an image signal processing method executed by the control unit 411 will be described.

Figure 6A:
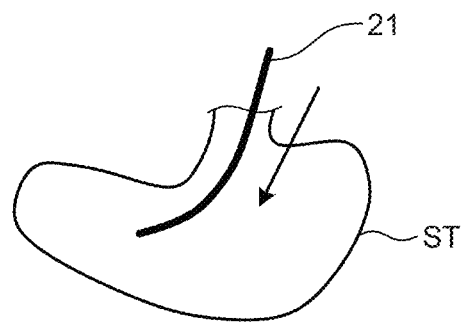
FIG. 6A is a diagram for describing a treatment flow.
Figure 6B:
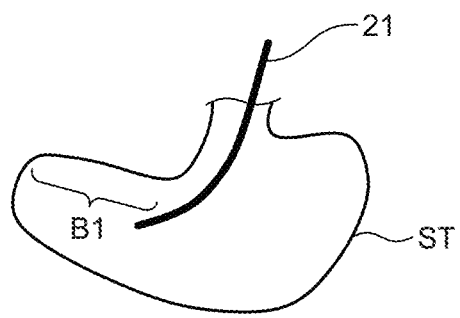
FIG. 6B is a diagram for describing a treatment flow.
Figure 6C:
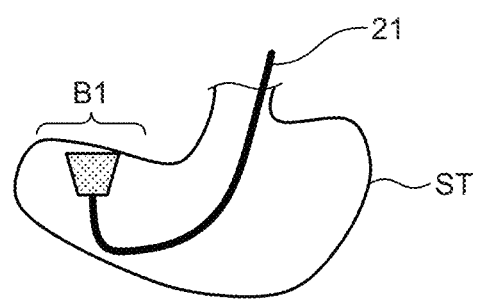
FIG. 6C is a diagram for describing a treatment flow.
Figure 7:
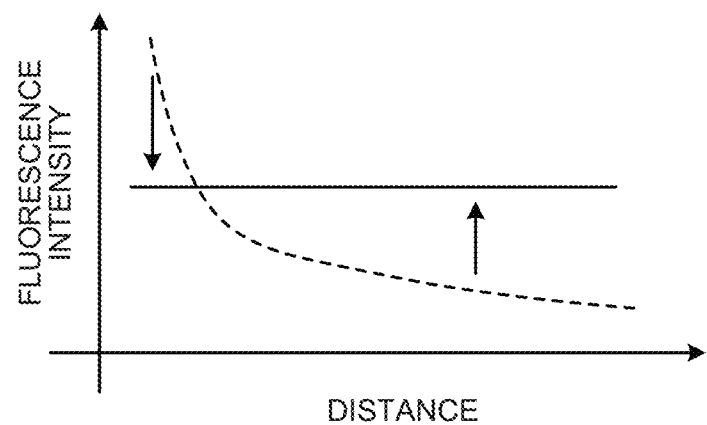
FIG. 7 is a diagram for describing a change in a signal due to fluorescence normalization.

FIG. 5 is a flowchart illustrating an image signal processing method. FIGS. 6A to 6C are diagrams for describing a treatment flow. FIG. 7 is a diagram for describing a change in a signal due to fluorescence normalization.

First, the control unit 411 causes the first light source 421 of the first and second light sources 421, 422 to emit white light in accordance with a user operation on the operating unit 22 or the input unit 413 by a user such as an operator (Step S1).

After Step S1, the control unit 411 acquires a first image signal from the imaging element 53, and executes first image process on the first image signal. Examples of the first image process include an optical black subtraction process, a white balance adjustment process, a demosaic process, a color correction process, a gamma correction process, and a YC process for converting RGB signals into luminance signals and color difference signals (Y, $C_B/C_R$ signals). Then, the control unit 411 displays, on the display device 3, an image (hereinafter, referred to as a white light image) based on the first image signal after the execution of the first image process (Step S2).

Here, as illustrated in FIG. 6A, the operator inserts the insertion unit 21 into a stomach ST. Then, the operator searches for the treatment position while checking the white light image in the stomach ST displayed on the display device 3. Here, it is assumed that a tumor B1 (FIG. 6B) is treated as a treatment target. At this time, the operator administers an antibody drug to the tumor B1 as a treatment target site. The administration of the antibody drug may be performed using the endoscope 2, may be performed using another device, or may be performed by allowing the patient to take the drug. Then, the operator determines a region including the tumor B1 as an irradiation region while checking the white light image, and directs the distal end of the insertion unit 21 toward the tumor B1.

After Step S2, the control unit 411 stops the operation of the first light source 421 (stops the emission of the white light), operates the second light source 422, and emits the excitation light according to the user operation on the operating unit 22 or the input unit 413 by the user such as the operator (Step S3). Then, when the tumor B1 is irradiated with the excitation light from the distal end of the insertion unit 21, the antibody drug bound to the tumor B1 reacts and treatment for the tumor B1 is performed (FIG. 6C).

Although the excitation light emitted from the second light source 422 is used for treatment, the disclosure is not limited thereto. For example, the excitation light is used to check the effect of treatment. Then, light in a second wavelength band similar to the excitation light may be emitted from another light source different from the second light source 422, and the light may be used as treatment light used for treatment. For example, it is possible to adopt a configuration in which the tumor B1 is irradiated with the treatment light from a treatment tool that is inserted into a treatment tool channel (not illustrated) provided in the insertion unit 21 and protrudes from the distal end of the insertion unit 21.

After Step S3, the control unit 411 acquires a first image signal from the imaging element 53, and executes a second image process on the first image signal. The second image process includes processing of extracting only the image signal output from the R pixel 53r provided with the R filter group 54r that mainly transmits the light in the R wavelength band closest to the wavelength band of the excitation light among the first image signals (image signals output from the pixels 53r, 53g, and 53b). Then, the control unit 411 displays, on the display device 3, an image (hereinafter, referred to as an excitation light image) based on the image signal output from the R pixel 53r among the first image signals (Step S4).

Then, by checking the excitation light image, the user such as the operator can grasp the irradiation position of the excitation light.

After Step S4, the control unit 411 acquires the second image signal from the imaging element 53 (Step S5). Then, the control unit 411 executes a third image process on the second image signal (Step S5). As the third image process, processing substantially similar to the first image process described above can be exemplified. Hereinafter, for convenience of description, an image based on the second image signal after the third image process is performed is referred to as a fluorescence image.

Here, the fluorescence intensity corresponding to the antibody drug in the fluorescence image varies depending on the distance between the tumor B1 and the imaging device 5 as indicated by a broken line in FIG. 7 even when the tumor B1 containing the antibody drug emits the same fluorescence intensity. Therefore, in order to obtain a constant fluorescence intensity (solid line in FIG. 7) even when the distance changes, the fluorescence intensity is normalized by Steps S6 and S7 described below.

After Step S5, the control unit 411 acquires the first image signal from the imaging element 53, and executes a fourth image process on the first image signal. The fourth image process includes processing of extracting only the image signal output from the B pixel 53b provided with the B filter group 54b that mainly transmits the light in the B wavelength band farthest away from the R wavelength band closest to the wavelength band of the excitation light among the first image signals (image signals output from the pixels 53r, 53g, and 53b). Then, the control unit 411 uses the image signal output from the B pixel 53b among the first image signals as a reference optical signal (Step S6).

After Step S6, the control unit 411 normalizes the fluorescence intensity by dividing the second image signal (luminance value) after the third image process is performed in Step S5 by the reference optical signal (luminance value) calculated in Step S6 (Step S7).

After Step S7, the control unit 411 displays, on the display device 3, the excitation light image and the image (hereinafter, it is described as a normalized fluorescence image) based on the second image signal after the fluorescence intensity is normalized in Step S7 (Step S8).

Note that displaying the excitation light image and the normalized fluorescence image on the display device 3 includes the following display pattern.

That is, the first display pattern is a display pattern in which the excitation light image and the normalized fluorescence image side by side is displayed on the display device 3.

Furthermore, the second display pattern is a display pattern in which only one of the excitation light image and the normalized fluorescence image is displayed on the display device 3 by switching between the excitation light image and the normalized fluorescence image in accordance with a user operation on the operating unit 22 or the input unit 413 by the user such as the operator.

Further, the third display pattern is a display pattern in which a superimposed image obtained by superimposing the normalized fluorescence image on the excitation light image is displayed on the display device 3.

According to the present embodiment described above, the following effects are obtained.

Figure 8:
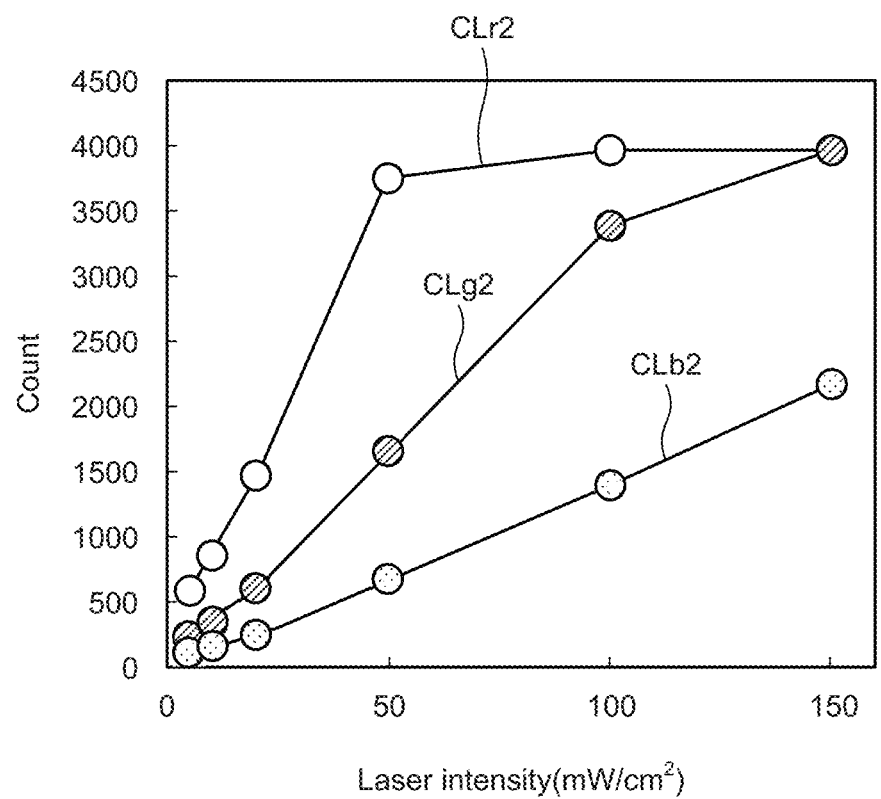
FIG. 8 is a view for describing effects of the embodiment.

FIG. 8 is a view for describing effects of the embodiment. Here, in FIG. 8, "CLr2" is a curve indicating the sensitivity of the R pixel 53r to the intensity of the excitation light. "CLg2" is a curve indicating the sensitivity of the G pixel 53g to the intensity of the excitation light. "CLb2" is a curve indicating the sensitivity of the B pixel 53b to the intensity of the excitation light.

The sensitivity of the R pixel 53r provided with the R filter group 54r that mainly transmits the light in the R wavelength band closest to the wavelength band of the excitation light is saturated when the intensity of the excitation light is 50 [mW/cm$^2$] or more as illustrated in FIG. 8. On the other hand, the sensitivity of the B pixel 53b provided with the B filter group 54b that mainly transmits the light in the B wavelength band farthest from the R wavelength band closest to the wavelength band of the excitation light is not saturated even if the intensity of the excitation light is 150 [mW/cm$^2$].

Then, for example, in a case where the image signal output from the R pixel 53r that is saturated among the first image signals is used as the reference optical signal, and the second image signal is normalized by a reference optical signal, the fluorescence intensity of the second image signal cannot be accurately normalized.

In the control device 41 according to the present embodiment, the image signal output from the B pixel 53b that is not saturated among the first image signals is used as a reference optical signal, and the second image signal is normalized by the reference optical signal. Therefore, the fluorescence intensity of the second image signal can be accurately normalized.

Furthermore, in the control device 41 according to the present embodiment, as the excitation light image for checking the irradiation position of the excitation light, an image based on the image signal output from the R pixel 53r provided with the R filter group 54r that mainly transmits the light in the R wavelength band closest to the wavelength band of the excitation light among the first image signals is used. Therefore, the excitation light image can be an image with a high luminance value, and the user such as the operator can clearly grasp the irradiation position of the excitation light from the excitation light image.

Other Embodiments

Although the embodiments for carrying out the disclosure have been described so far, the disclosure should not be limited simply by the above-described embodiments.

In the above-described embodiment, in Step S4, among the first image signals (image signals output from the pixels 53r, 53g, and 53b), only the image signal output from the R pixel 53r provided with the R filter group 54r that mainly transmits the light in the R wavelength band closest to the wavelength band of the excitation light is extracted, and the extracted image signal is used as the image signal for checking the irradiation position of the excitation light, but the disclosure is not limited thereto. The first image signal (normal image signal output from each of the pixels 53r, 53g, and 53b) itself may be used as the image signal for checking the irradiation position of the excitation light.

In the above-described embodiment, in Step S6, the image signal output from the B pixel 53b provided with the B filter group 54b that mainly transmits the light in the B wavelength band farthest away from the R wavelength band closest to the wavelength band of the excitation light is used as the reference optical signal, but the disclosure is not limited thereto. The reference optical signal may be the following image signal as long as it is the image signal output from the pixels 53g and 53b provided with the filter groups 54g and 54b other than the R filter group 54r that mainly transmits the light in the R wavelength band closest to the wavelength band of the excitation light.

For example, the image signal output from the G pixel 53g provided with the G filter group 54g is used as the reference optical signal.

Furthermore, for example, an image signal obtained by adding corresponding signal values of an image signal output from the G pixel 53g provided with the G filter group 54g and an image signal output from the B pixel 53b provided with the B filter group 54b is used as the reference optical signal.

In the embodiment described above, the PIT is described as an example, and thus the wavelength band of the excitation light is 680 nm or more, but the disclosure is not limited thereto.

When indocyanine green (ICG) observation is performed, excitation light having a wavelength of about 785 nm may be used. At this time, in order to check the irradiation position of the excitation light, as in Step S4 described in the above-described embodiment, the image signal output from the R pixel 53r provided with the R filter group 54r that mainly transmits the light in the R wavelength band closest to the wavelength band of the excitation light may be used. As the reference optical signal, as in Step S6 described in the above-described embodiment, the following image signals may be used as long as it is the image signals output from the pixels 53g and 53b provided with the filter groups 54g and 54b other than the R filter group 54r that mainly transmits the light in the R wavelength band closest to the wavelength band of the excitation light.

For example, an image signal output from the B pixel 53b provided with the B filter group 54b is used as the reference optical signal.

Furthermore, for example, an image signal output from the G pixel 53g provided with the G filter group 54g is used as the reference optical signal.

Moreover, for example, an image signal obtained by adding corresponding signal values of an image signal output from the G pixel 53g provided with the G filter group 54g and an image signal output from the B pixel 53b provided with the B filter group 54b is used as the reference optical signal.

When fluorescein is used as the drug, excitation light having a wavelength of about 494 nm may be used. At this time, in order to check the irradiation position of the excitation light, in Step S4 described in the above-described embodiment, the image signal output from the G pixel 53g provided with the G filter group 54g that mainly transmits the light in the G wavelength band closest to the wavelength band of the excitation light may be used. In addition, as the reference optical signal, in Step S6 described in the above-described embodiment, the following image signals may be used as long as it is the image signals output from the pixels 53b and 53r provided with the filter groups 54b and 54r other than the G filter group 54g that mainly transmits the light in the G wavelength band closest to the wavelength band of the excitation light.

For example, an image signal output from the B pixel 53b provided with the B filter group 54b is used as the reference optical signal.

Furthermore, for example, the image signal output from the R pixel 53r provided with the R filter group 54r is used as the reference optical signal.

Moreover, for example, an image signal obtained by adding corresponding signal values of an image signal output from the B pixel 53b provided with the B filter group 54b and an image signal output from the R pixel 53r provided with the R filter group 54r is used as the reference optical signal.

Further, when MB-102 is used as the drug, excitation light having a wavelength of about 435 nm may be used. At this time, in order to check the irradiation position of the excitation light, in Step S4 described in the above-described embodiment, the image signal output from the B pixel 53b provided with the B filter group 54b that mainly transmits the light in the B wavelength band closest to the wavelength band of the excitation light may be used. In addition, as the reference optical signal, in Step S6 described in the above-described embodiment, the following image signals may be used as long as it is the image signals output from the pixels 53r and 53g provided with the other filter groups 54r and 54g except the B filter group 54b that mainly transmits the light in the B wavelength band closest to the wavelength band of the excitation light.

For example, the image signal output from the R pixel 53r provided with the R filter group 54r is used as the reference optical signal.

Furthermore, for example, an image signal output from the G pixel 53g provided with the G filter group 54g is used as the reference optical signal.

Moreover, for example, an image signal obtained by adding corresponding signal values of an image signal output from the R pixel 53r provided with the R filter group 54r and an image signal output from the G pixel 53g provided with the G filter group 54g is used as the reference optical signal.

As described above, in a case where the wavelength of the excitation light is 400 nm or more and 600 nm or less, the image signal output from the R pixel 53r provided with the R filter group 54r that mainly transmits the light in the R wavelength band in Step S6 described in the above-described embodiment can be used as the reference optical signal.

In Step S3 of the above-described embodiment, the emission of the white light may not be stopped. That is, in Step S3, the white light and the excitation light may be simultaneously emitted. At this time, before Step S6, the control unit 411 temporarily stores a signal value for each pixel of the first image signal in a state where only white light is emitted in the storage 412 in advance as a background value. Then, when calculating the reference optical signal in Step S6, the control unit 411 subtracts the above-described background value from the signal value of each pixel of the first image signal in a state where the white light and the excitation light are simultaneously emitted. Furthermore, the control unit 411 uses, as a reference optical signal, an image signal output from a pixel provided with the filter group other than the filter group that mainly transmits light in a wavelength band closest to the wavelength band of the excitation light, among the subtracted first image signals.

With such a configuration, even in a case where white light and excitation light are simultaneously emitted, the reference optical signal can be calculated as an appropriate signal, and the fluorescence intensity can be accurately normalized.

In the above-described embodiment, the imaging device 5 is configured by the two-eyes single-plate, but the disclosure is not limited thereto, and the following configuration may be used.

For example, the imaging device 5 may include two imaging elements corresponding to the first and second optical systems 51 and 52, and may be configured by two-eyes two-plates.

Furthermore, for example, the imaging device 5 may use a technology of extended depth of field (EDOF) that divides optical paths by a prism.

Furthermore, for example, the imaging device 5 may be configured by single-eye two-plates using a beam splitter.

In the above-described embodiment, in consideration of the object of the disclosure, the first light source 421 is not an essential configuration and may not be provided.

According to the image signal processing device, the endoscope system, the image signal processing method, and the image signal processing program according to the disclosure, the fluorescence intensity can be accurately normalized.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image signal processing device comprising: a processor configured to process a first image signal and a second image signal, the first image signal being obtained by a first imaging portion capturing excitation light that is reflected from an observation target by irradiating the observation target with the excitation light, the second image signal being obtained by a second imaging portion capturing fluorescence from the observation target when excited by irradiating the observation target with the excitation light,
a color filter in which a plurality of filter groups having spectral characteristics different from each other is disposed in a specific format being provided on a light receiving face of the first imaging portion,
the processor being configured to
process the first image signal,
calculate a reference optical signal based on a signal from a pixel of the first imaging portion provided with a filter group other than a filter group corresponding to a wavelength band of a color closest to a wavelength of the excitation light among the plurality of filter groups, and
normalize the second image signal based on the reference optical signal.

2. The image signal processing device according to claim 1, wherein
the plurality of filter groups is three filter groups grouped according red, green, and blue wavelength bands, wherein
a wavelength of the excitation light is a wavelength longer than 680 nm, and wherein
the processor is configured to calculate the reference optical signal based on a signal from a pixel of the first imaging portion provided with a filter group other than a filter group corresponding to a red wavelength band among the plurality of filter groups.

3. The image signal processing device according to claim 2, wherein
the processor is configured to use, as the reference optical signal, a signal from a pixel of the first imaging portion provided with a filter group corresponding to a blue wavelength band.

4. The image signal processing device according to claim 2, wherein the processor is configured to use, as the reference optical signal, a signal from a pixel of the first imaging portion provided with a filter group corresponding to a green wavelength band.

5. The image signal processing device according to claim 2, wherein
the reference optical signal is calculated based on a signal from a pixel of the first imaging portion provided with a filter group corresponding to a blue wavelength band and on a signal from a pixel of the first imaging portion provided with a filter group corresponding to a green wavelength band.

6. The image signal processing device according to claim 1, wherein
the processor is configured to
store, in a storage, as a background value, a signal value for each pixel of the first image signal obtained by the first imaging portion capturing white light that is reflected from the observation target by irradiating the observation target with only the white light, and,
when the reference optical signal is calculated, subtract the stored background value from a signal value for each pixel of the first image signal obtained by the first imaging portion capturing the white light and the excitation light that are reflected from the observation target by simultaneously irradiating the observation target with the excitation light and the white light.

7. The image signal processing device according to claim 1, wherein
a wavelength of the excitation light is a wavelength of 400 nm or more and 600 nm or less, and wherein
the processor is configured to use, as the reference optical signal, a signal from a pixel of the first imaging portion provided with a filter group corresponding to a red wavelength band.

8. The image signal processing device according to claim 1, wherein
the processor is configured to
process the first image signal, and
use, as a signal for checking an irradiation position of the excitation light, a signal from a pixel of the first imaging portion provided with the filter group corresponding to the wavelength band of the color closest to the color of the wavelength of the excitation light among the plurality of filter groups.

9. An endoscope system comprising:
a light source configured to irradiate excitation light;
a first imaging portion configured to output a first image signal by capturing the excitation light that is reflected from an observation target by irradiating the observation target with the excitation light; and
a second imaging portion configured to output a second image signal by capturing fluorescence from the observation target when excited by irradiating the observation target with the excitation light; and
an image signal processing device, wherein the image signal processing device includes
a processor configured to process the first image signal and the second image signal, wherein
a color filter in which a plurality of filter groups having spectral characteristics different from each other is disposed in a specific format is provided on a light receiving face of the first imaging portion, and wherein
the processor is configured to
process the first image signal,
calculate a reference optical signal based on a signal from a pixel of the first imaging portion provided with a filter group other than a filter group corresponding to a wavelength band of a color closest to a color of a wavelength of the excitation light among the plurality of filter groups, and
normalize the second image signal based on the reference optical signal.

10. An image signal processing method executed by a processor of an image signal processing device, the method comprising:
processing a first image signal obtained by a first imaging portion capturing excitation light that is reflected from an observation target by irradiating the observation target with the excitation light,
calculating a reference optical signal based on a signal from a pixel of the first imaging portion provided with a filter group other than a filter group corresponding to a wavelength band of a color closest to a color of a wavelength of the excitation light; and
normalizing, based on the reference optical signal, a second image signal obtained by a second imaging portion capturing fluorescence from the observation target when excited by irradiating the observation target with the excitation light.

11. A non-transitory computer-readable recording medium with an executable program stored thereon, the program causing a processor of an image signal processing device to execute:
processing a first image signal obtained by a first imaging portion capturing excitation light that is reflected from an observation target by irradiating the observation target with the excitation light,
calculating a reference optical signal based on a signal from a pixel of the first imaging portion provided with a filter group other than a filter group corresponding to a wavelength band of a color closest to a color of a wavelength of the excitation light; and
normalizing, based on the reference optical signal, a second image signal obtained by a second imaging portion capturing fluorescence from the observation target when excited by irradiating the observation target with the excitation light.

* * * * *